Dec. 20, 1955 H. W. JURY 2,727,942

TELEVISION SYNCHRONIZING APPARATUS

Filed May 11, 1950 5 Sheets-Sheet 1

INVENTOR.

Harold W Jury

Dec. 20, 1955 H. W. JURY 2,727,942

TELEVISION SYNCHRONIZING APPARATUS

Filed May 11, 1950 5 Sheets-Sheet 2

INVENTOR.

Harold W. Jury

INVENTOR.
Harold W. Jury

INVENTOR.
Harold W. Jury

Dec. 20, 1955 H. W. JURY 2,727,942

TELEVISION SYNCHRONIZING APPARATUS

Filed May 11, 1950 5 Sheets-Sheet 5

INVENTOR.
Harold W. Jury

United States Patent Office 2,727,942

Patented Dec. 20, 1955

2,727,942

TELEVISION SYNCHRONIZING APPARATUS

Harold W. Jury, Northridge, Calif., assignor to Don Lee Division of General Teleradio, Inc., Los Angeles, Calif., a corporation of California Application May 11, 1950, Serial No. 161,439

12 Claims. (Cl. 178—6)

This invention relates to electronic apparatus for television transmission. More particularly, it is concerned with synchronizing television scanning operations from plural locations.

In the television broadcasting art, it is often necessary to transfer the point of image origination from the studio to a remote location or to a television network connection. Under the prior art such changes have usually been accompanied by serious disturbances of the image in the homes of the public or have been accomplished by a complete fade between the two programs during which the synchronizing pulses as well as the image signals are interrupted.

It has heretofore been impossible to accurately superimpose an image from one location upon an image from another because of the inescapable and continual variation in phase between the scanning synchronizing devices at the two locations.

It is a major object of the present invention to accomplish switching or fading transition from one location to another without transmission disturbances of any kind.

It is another object of this invention to allow superimposition of television images from plural locations.

It is still another object of this invention to cause co-synchronization at fixed phase between plural locations automatically, and having the capability of automatic restoration of synchronization in case one of the originating sources should become inoperative.

Still another object of this invention is to allow re-timing and reshaping of synchronizing impulses, thereby to cause the same to conform more closely to a fixed standard than in otherwise possible.

Still another object of this invention is to allow independent adjustment of the picture contrast at a location far removed from the point of image origination.

Still another object of this invention is to allow independent adjustment of duration of horizontal and/or vertical blanking at a location far removed from the point of image origination.

Still another object of this invention is to allow independent adjustment of the picture brightness level at a location far removed from the point of image origination.

Still another object of this invention is to remove interference from both the synchronizing impulses and from the black level of the video component of the image signals prior to broadcast transmission.

Still another object of this invention is to accomplish the above mentioned objects without employing an additional wire line, radio link or other form of auxiliary communication between the plural locations.

Still another object of this invention is to provide from the remote signal the necessary blanking, vertical driving, and horizontal driving pulses in phase with those which are inherent in the remote signal which can be used to shade or drive any number of studio or local cameras in exact phase relation with the remote picture, so that all pictures can be handled on a single production fading and switching console.

A final object of this invention is to provide apparatus with automatic means for allowing the local pulse generating equipment to take over, with unnoticeable interruption, control of all studio cameras and local television equipment in the event that the remote signal ceases or diminishes to any predetermined level.

The manner in which these objects are attained is illustrated in the accompanying drawings, in which.

Vacuum tube heaters and power supplies are not shown in the schematic diagrams, in accordance with usual practice.

In brief, the method of this invention consists in receiving television image signals from a remote location, separating, delaying and reasonably completely dissecting both the video and the synchronizing components thereof, driving local operations with the separated synchronizing component and reassembling all video components with the separated synchronizing component to provide one character of output image signal for broadcasting purposes.

Figure 7:
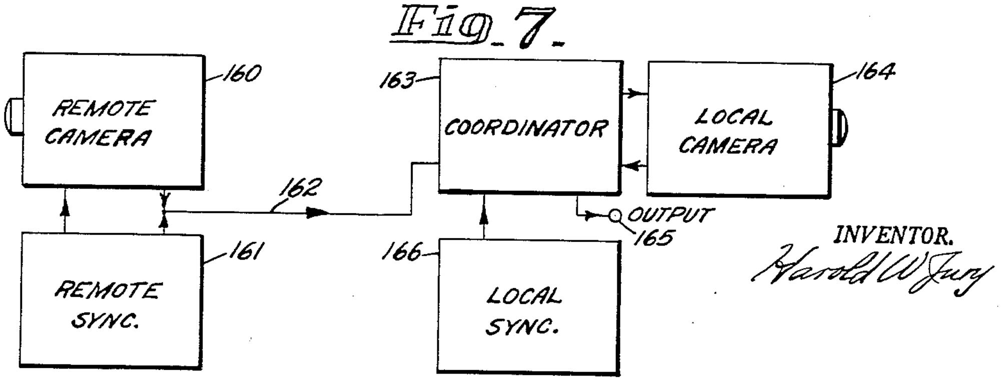
Fig. 7 shows a block diagram illustrating the overall aspects of my invention.

This is shown in Fig. 7, wherein remote camera 160 originates the remote image signal and element 161 the remote synchronizing signal. These are conveyed over the single unidirectional channel 162 to the local location. Entering coordinator 163 the remote signal is processed as described above and coordinated synchronizing signals therefrom synchronize the local camera 164. The coordinated synchronizing signals are also fed to the output terminal 165, and depending upon the needs of the program either or both of the image signals from the remote and local cameras. At such time as the remote equipment is not in use or automatically in an emergency, synchronization to camera 164 and output terminal 165 is provided from local synchronizing source 166.

The prior art has been blocked from accomplishing the method of my invention because no method nor means have heretofore existed to create properly timed vertical blanking impulses from the synchronizing impulses received from the remote operation.

I accomplish this by initiating the leading edge of the vertical blanking pulse on the field in which a half horizontal line occurs before the first equalizing pulse with that pulse, and by initiating said leading edge by creating a transient from the trailing edge of the first equalizing pulse on the field in which a whole horizontal line occurs before the first equalizing pulse. Further, I add in the horizontal blanking pulse that occurs slightly before said transient and thereby the leading edge of said blanking pulse occurs at the same instant as the previously formed leading edge of the vertical blanking pulse of the prior frame. In this way, all vertical blanking pulses start at the same proper relative time in each frame and I am thus able to form a fully standard waveform that is accurately driven by the remote synchronizing signal.

There are other aspects to my invention which have also blocked the prior art, such as forming an integrated coincidence of vertical synchronizing pulses as a prerequisite for and an actuating agent in acomplishing nondisturbance setup or breakdown of the plural waveform operation. Further aspects will become apparent in further reading of the specification.

An important difference between the prior art and my invention lies in the fact that the art has always had to be content with attempting to keep two independent waveform sources in exact phase, whereas I form waveforms at one location from the waveforms which originated at another. In addition to this phase problem the prior art has had to secure field and line waveform coincidence by careful adjustments before switching control. Since I utilize only one primary synchronizing source this adjustment is unnecesary.

The remote television signal is divided into two main parts; namely, the picture and blanking information to one channel and the synchronizing pulses to another channel. The picture and blanking information can be altered by the addition of certain pulses to allow the contrast and brightness of the picture to be varied independently.

The remote picture signal is presented in a manner similar to any television camera output signal. It may then be utilized in the same manner as any one of the camera outputs in a production switching unit.

The remote synchronizing pulse is utilized to generate pulses which are used to remove interference and correct inaccuracies that may exist in the remote signal, to generate the pulses necessary to make the local cameras and other equipment operate in the same phase relation as the remote signal, and to cause local synchronizing equipment to automatically take over control when the remote signal level diminishes below a predetermined amplitude.

Progress test on the preferred embodiment have shown that the functions of the apparatus outlined in this specification are fulfilled in a very satisfactory manner.

In somewhat more detail, the subject device, which I choose to call the "coordinator," receives the composite television signal from the remote or network origination. A unity gain amplifier section supplies an output identical to the input for monitoring purposes. See Fig. 1. The remote or network composite signal is then completely stabilized and clamped, removing all traces of hum, phase shift, or irregularity in black level, in the following manner.

The sync is stripped from the composite signal at any controllable level just above, or at, the black level. The picture and blanking signal from the remote location passes through circuits which allow: (1) blanking width increase, if necessary, (2) control of the average brightness of the remote picture and, (3) independent control of contrast inherent in the video content of the distant signal. These adjustments allow independent control of either blanking (brightness level) or contrast in the remote signal at the studio, a new and highly desirable accomplishment. The remote or network picture then resembles any television camera channel output, having only blanking and picture components. This output appears on the usual 75 ohm coaxial line which is fed into the production switching console for cutting, fading or superimposing, along with the studio camera outputs.

In much the same manner, the video and blanking are clipped off and discarded in a second channel. The synchronizing component is then utilized in two ways:

First, the sync is shaped and clipped to remove the noise and to correct the front and back slopes. Also, if the duration of the front porch is improper or overshoot transients exist at black level, these are corrected. This improved sync is supplied on a 75 ohm line for remixing with the video and blanking signals from the usual production switching and fading console.

Second, the remote sync "slaves" the remainder of the coordinator pulse generating and shaping system and actuates the automatic means for switching between local and remote control.

Figure 2:
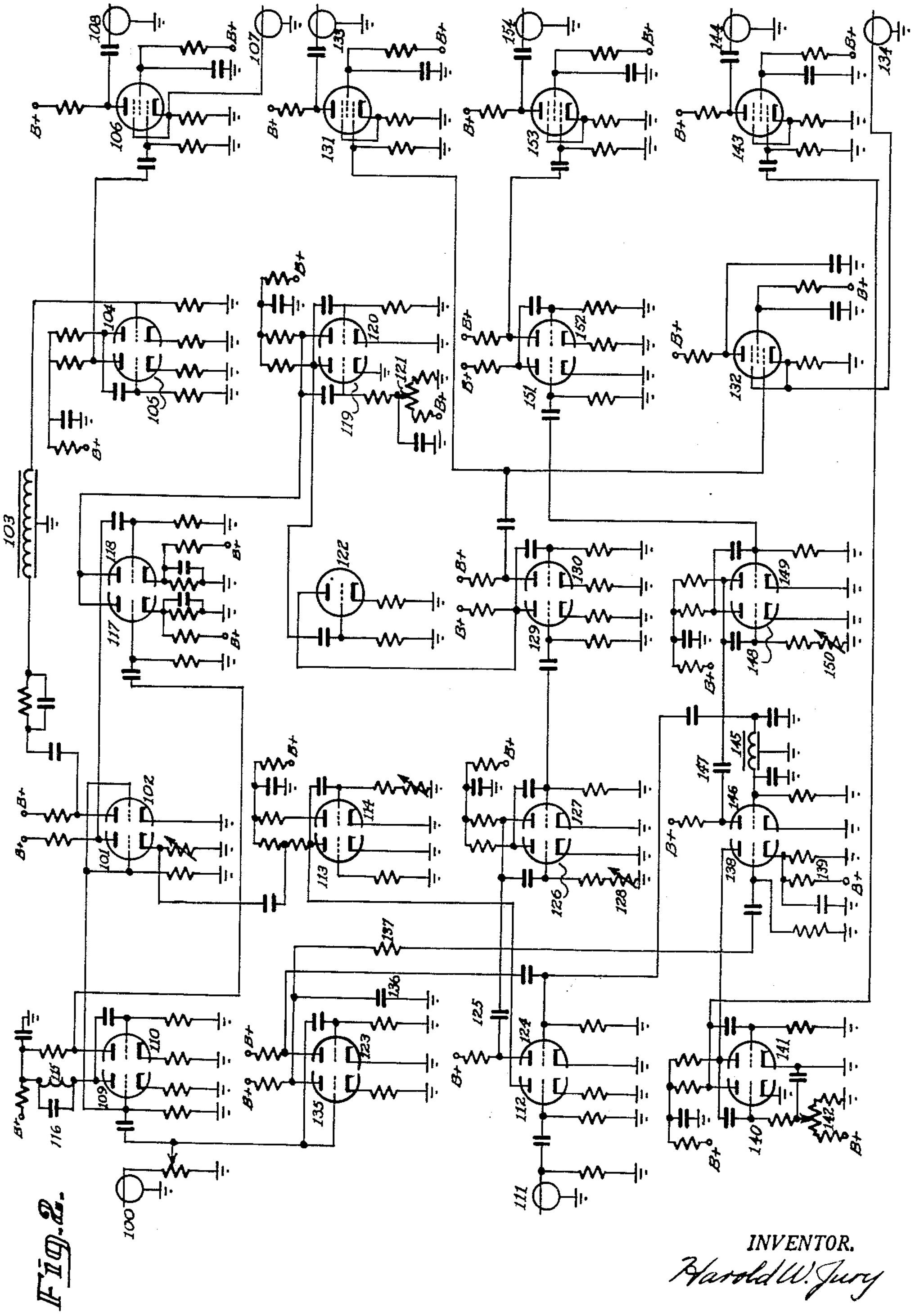
Fig. 2 shows the schematic diagram of that portion of the apparatus which generates and shapes the electrical impulses to operate the local television cameras and television input equipment.

In the shaping portion of the coordinator, Fig. 2, both vertical and horizontal blanking and driving pulses are produced from the remote information by unusual circuit functions. These pulses are adjustable in duration and can be made to conform, for instance, to RMA pulse standards in all respects. This output is then used to operate all studio equipment in the same manner as the standard studio synchronized pulse generator would normally be employed. All pulses thus generated for studio equipment are in proper time relation to the remote or network signal pulses. This has the same result as though all the studio equipment, including cameras, projectors, etc. were at the remote location even though it be across-country, in network operations. From the vertical pulse three-phase power can be generated for synchronizing the motor drive of the film projectors.

Consequently, remote and local program material can be mixed and superimposed at will with rock-steadiness of the resulting images. Prior methods of attempting to control remote synchronization from the studio or attempting to keep two isolated systems locked in phase both vertically and horizontally give unstable results and require manual setup or adjustment.

Whenever a proper level of signal is put into my coordinator, all functions occur automatically and without adjustments. Means are provided to automatically switch control to a local sync generator in the event that the network or remote signal drops or fades to any predetermined level.

Figure 1:
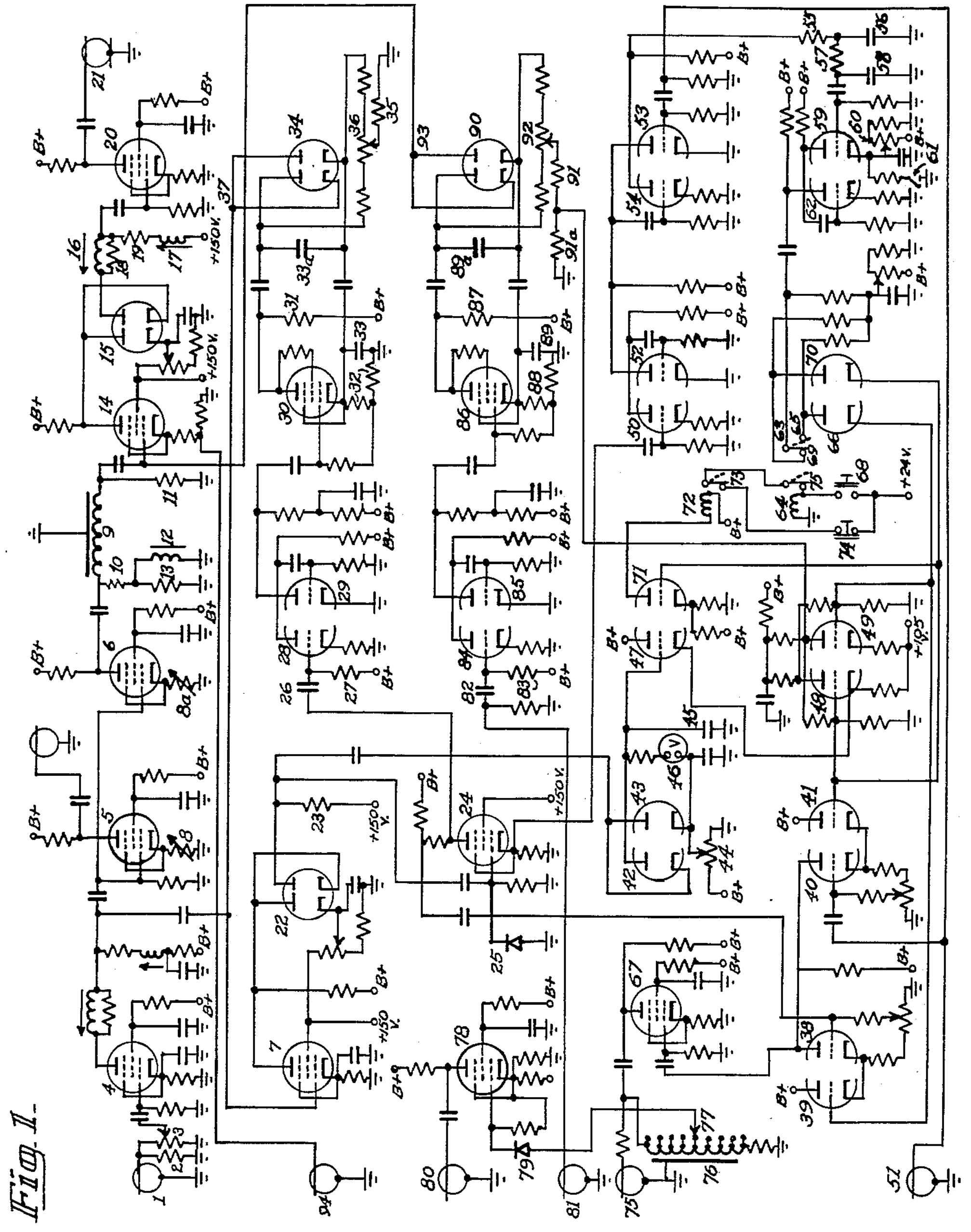
Fig. 1 shows the schematic diagram of that portion of the apparatus which accepts, amplifies, stabilizes and controls the remote signal picture and comprises the automatic means for determining control by the remote or the local studio equipment.

Passing now to a detailed description of the preferred apparatus, a remote composite signal such as shown in Fig. 3*a*, which may contain noise, transients, and/or phase shifts, is introduced at terminal 1 in Fig. 1. The combination of resistors 2 and 3 terminate the incoming coaxial line to its charactertistic impedance, usually 75 ohms. A convenient signal level can be obtained by adjusting resistor 3. This is impressed upon conventional compensated video amplifying stage identified by vacuum tube 4. The output thereof is impressed upon the grids of vacuum tubes 5, 6 and 7. Tube 5 performs the function of a bridging amplifier, the gain of which is adjustable by means of variable cathode resistor 8 for local monitoring output.

In the plate circuit of similar stage 6 is connected the delay line 9 which may conveniently have a delay of 2.1 microseconds. Resistors 10 and 11 terminate this line in its characteristic impedance. Inductor 12 and resistor 13 frequency-compensate the line.

The delayed composite signal, as shown at Fig. 3*b*, from 9 is then impressed upon the grid of amplifier tube 14. The amplitude thereof is controlled by variable cathode resistor 8*a* of tube 6, which is the contrast control for the remote picture. Dual diode 15 is an electronic load switch which presents inductors 16 and 17 and resistors 18 and 19 as a video compensated load to tube 14 during the image and blanking excursions of the waveform only. The control grid bias for tube 14 is supplied by another diode, to be described later, and has the effect of removing the synchronizing pulses, leaving only blanking and image portions to be impressed upon the grid of tube 20. The corresponding output appears at terminal 21 and has the form of waveform, Fig. 3*k*. A full explanation of the exact treatment of the signal by tube 14 will be given near the end of this detailed description.

Passing now to tube 7, this tube and diode 22 act in an inverse but analogous manner to the previously recited combination, resulting in the sync pulses only being present across resistor 23, as shown at Fig. 3*c*. The amplitude of these pulses varies with that of the original signal.

These pulses are impressed upon the grid of tube 24 with a D. C. voltage proportional to the amplitude of said pulses as a result of rectification of a portion of the amplitude by rectifier 25, which may be of the crystal type. This sets the base portion of the pulse always at the same point on the grid characteristic of tube 24, a limiting clipper amplifier, so that the timing of the leading edge and the amplitude of signal as shown at Fig. 3*d* will remain the same on the plate of tube 24 with all noise removed.

Waveform, Fig. 3*d*, is the same as Fig. 4*a*. It is differentiated by small capacitor 26 and resistor 27, appearing at the grid of tube 28 as the waveform of Fig. 4*b*. The output of tube 28 depicts in part on a line-frequency time scale the same signal at the same point in the circuit as that depicted on a field-frequency time scale in the input except for amplification and inversion and appears at the plate as waveform 4*c*.

Triode 29 acts as a self-biased clipper, allowing only the positive peaks of waveform 4*c* to appear in the anode circuit, in the usual inverted phase, as shown at Fig. 4*d*.

Figure 4:
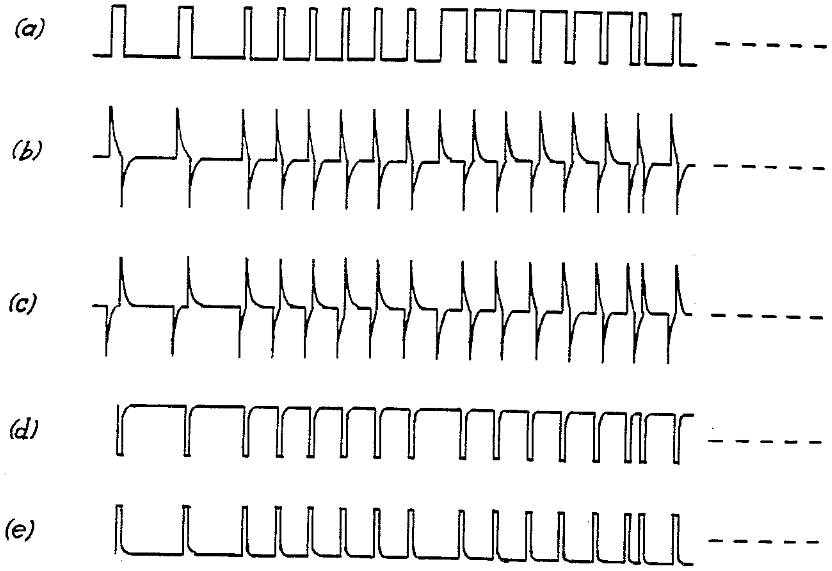
Fig. 4 shows waveforms concerned with the formation of clamping pulses.

Vacuum tube 30 reproduces this waveform in both phases *d* and *e* in Fig. 4, by virtue of plate resistor 31 and essentially unbypassed cathode resistor 32; capacitor 33 being of only a few micromicrofarads capacitance for enhancing the high frequency response at the plate of the tube. Both series of pulses are impressed upon dual diode 34, small capacitor 33*a* equalizing the high frequency response. Either a positive or a negative series of pulses predominates over resistor 35 depending upon where the adjustable arm of variable resistor 36 is located. At the instant that the pulses occur the junction of the first cathode and the second anode, point 37, is at the same potential as that at adjustable arm of resistor 36. The adjustable arm of resistor 36 is adjusted to clip the sync pulses in tube 7 just below the black level as shown by the lower dotted line in waveform 3*a*, giving the waveform 3*c* across resistor 23.

Figure 3:
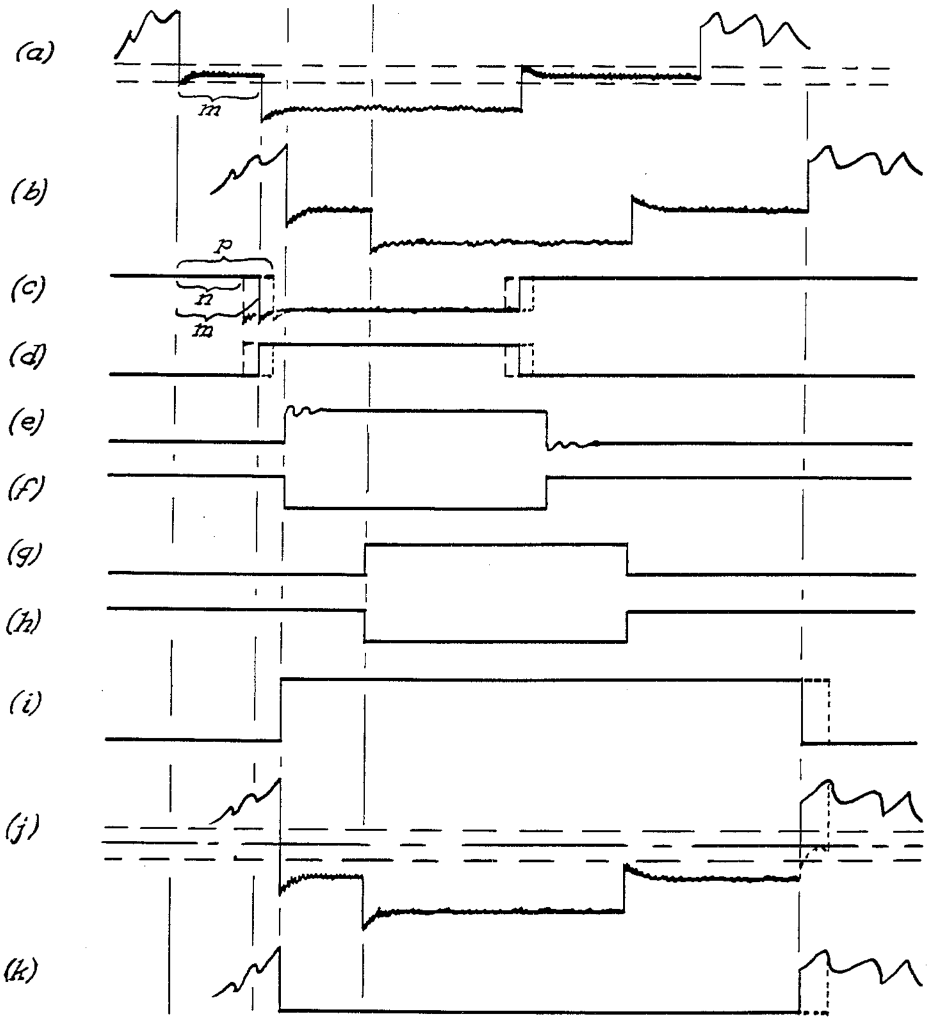
Fig. 3 shows details of horizontal waveform timing associated with reforming the remote signal for further use.

The constant level, limited sync signal as shown at *d* of Fig. 3 and *a* of Fig. 4 obtained on the plate of tube 24 is also impressed on the grid of tube 38. Tubes 38, 39, 40 and 41 constitute an electronic switch designed to have no inherent time constant. A sync signal similar to that clipped from the remote signal and applied to the grid of tube 40 is generated by a local sync generator and applied at terminal 51. The electronic switch, 38, 39, 40 and 41, with proper control of the bias on the grids of tubes 39 and 41 selects either the separated sync from the remote signal or the local sync signal for control of subsequent generating and shaping circuits.

The electronic switch operates as follows. As already pointed out, the sync signal separated from the remote television signal and occurring across resistor 23 varies in amplitude in proportion to the amplitude of the input signal. This negative pulse signal, Fig. 3*c*, is applied to a counter-type double diode, tubes 42 and 43, which are biased by voltage from potentiometer 44 so that the small capacitor 45 from the plate of tube 42 to ground is charged to a negative D. C. voltage. This is indicated by meter 46. Any portion of the charging pulse amplitude can be made ineffective in charging condenser 45 by setting the trip level bias from potentiometer 44 on the diodes. The result is that when the input signal reduces to a level that has been predetermined to be unusable capacitor 45 loses its negative charge to a point where D. C. amplifier tube 47 conducts, raising the voltage on the cathodes of tubes 47 and 48 positive enough to cause tube 48 to be cut off. Tubes 48 and 49 constitute a D. C. "flip flop" circuit in which one tube conducts while the other is cut off. The increased plate voltage resulting from tube 48 being cut off causes the grid of tube 49 to be made positive and tube 49 conducts.

As long as a remote signal at or above preset level is present, the negative charge remains on capacitor 45 and tube 47 does not draw current. The potentials of both cathodes of tubes 48 and 49 are at normal levels and either tube 48 or 49 can be made to conduct whenever one grid or the other is given a momentary positive voltage surge.

The negative sync pulse separated from the remote signal and impressed on the grid of tube 24 also appears on the cathode of tube 24. This signal is impressed upon the grid of tube 50 and is inverted to a positive sync pulse on the plate. A similar positive sync pulse from a local sync generator is applied at terminal 51. The signal from the plate of tube 50 is amplified in tube 52 and the signal from terminal 51 is amplified in tube 53. Both signals appear as negative pulses mixed on the combined plates of tubes 52 and 53. This mixed signal is further amplified in tube 54 and inverted to positive pulses. Each of these signals appear on the plate of tube 54 and as the waveform, Fig. 6*a*.

Because of the short duration of all pulses save the broad 60 cycle ones at "*s*" an increase in amplitude will not occur except when the broad positive pulses of the two signals overlap.

Figure 6:
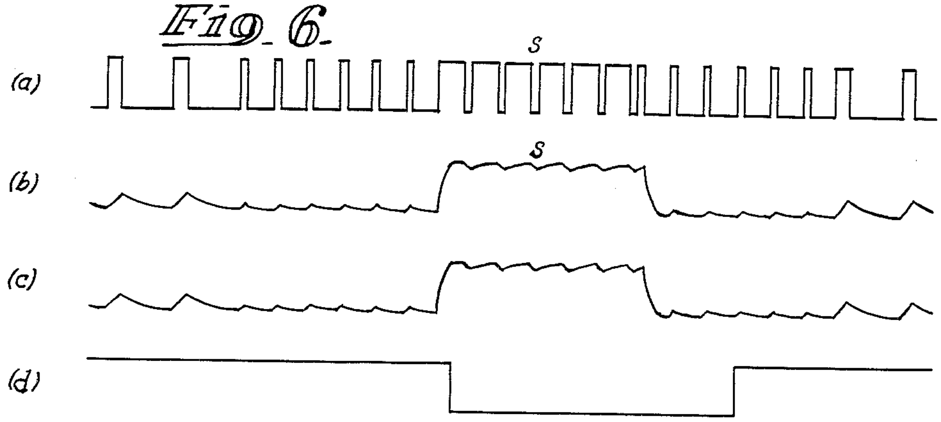
Fig. 6 shows waveforms concerned with automatic switching and vertical driving.

Resistors 55 and 57 and capacitors 56 and 58 comprise an integrating circuit which converts a signal at *a* of Fig. 6 to that at *b* of Fig. 6. If the two mixed signals applied to network 55, 56, 57, 58 are out of phase there will be two separate integrated pulses formed, but if the broad 60 cycle pulses from both are in phase the combined amplitude will be twice as great. This pulse is applied to the grid of tube 59. By means of potentiometer 60, tube 59 is biased to below cut off so that one of the integrated broad pulses will not cause current in tube 59, but the combined amplitude from the integrating network due to both broad pulses occurring in phase will cause conduction in tube 59. A negative 60 cycle pulse occurs at the plate of tube 59.

Momentary contact switch 61 is a manual means of setting the bias on tube 59 so that one broad pulse will cause the negative pulse to appear on the plate of tube 59. This is for emergency control purposes. The negative pulse from tube 59 is impressed on tube 62 to be amplified and inverted to a positive pulse which appears at common point 63 on the contacts of relay 64.

As the equipment is put into operation the contacts of all relays are in the position indicated by the dotted lines. Under this condition the positive pulses from tube 62 go to contact 65 and through the plate of diode 66 to the grid of tube 49, causing it to remain conducting and tube 48 to remain at cut-off. Under these conditions the plate of tube 49 and the grid of 48 are low in voltage. The plate of tube 48 and the grid of 49 are high in voltage.

Consequently, the grid of tube 39, which is connected to the grid of tube 49, is also high in voltage with the result that tube 39 is conducting. This causes the cathode voltage of tubes 39 and 38 to be relatively positive. This cuts off tube 38 and prevents the remote sync signal impressed on the grid of tube 38 from tube 24 from appearing at the grid of amplifier tube 67.

Also, the grid of tube 41, being connected to the grid of tube 48, is lowered in voltage. This cuts off tube 41, lowering the cathode voltage of tubes 40 and 41 and allowing tube 40 to be biased normally. It functions as an amplifier to allow the local sync from terminal 51 to pass from the grid of tube 40 and appear on the plate, thereby to be impressed on tube 67.

Depressing button 68, thereby closing the contacts, applies 24 volts from the usual relay supply (not shown) to relay 64. This causes the pulses at 63 to go to contact 69 and diode 70 and thence to the grid of tube 48. This causes tube 48 to start conducting with the first pulse coming from tube 62. Tubes 38, 41, and 48 are now all conducting while tubes 39, 40, and 49 are cut off. This results in the signal from terminal 51 being cut off in tube 40. It does not reach the grid of tube 67. On the other hand, the remote sync on the grid of tube 38 is amplified and applied to the grid of tube 67. Meantime, the increased positive grid voltage on tube 48 is also impressed on the grid of tube 71, causing it to conduct and close relay 72. This closes contacts 73 and permanently applies the 24 volt relay voltage to relay 64 through normally closed button 74, contacts 73 and 75. To return manually to the condition of local pulses controlling at the grid of tube 67 it is only necessary for button 74 to be depressed. This disconnects the 24 volts from relay 64 so that it opens allowing the trip pulses at 63 to again flow to diode 66 and trip tube 49 to conduction again. The grid voltage on tube 48 and 71 is reduced, cutting off tube 71 and opening relay 72.

The important function lies in the fact that no matter when the buttons are operated to switch to either local or remote sync pulse control the actual switch over is accomplished by the coincidence of the broad pulses from tube 62. Thus, the switch-over occurs when both systems are in the vertical blanking time and there is no visible effect in image.

Relay 72 has contacts in addition to those shown which operate indicating lights informing the operator whether control is local or remote.

In the instance where the phase of remote and local synchronizing systems does not vary with sufficient rapidity to accomplish changeover expeditiously, the operator has merely to adjust the lock-in phase of the local system until the indicating lamps show that the process has been accomplished.

Tracing the operation of automatic changeover, in the event that the remote origination point is in control and that the remote signal fades or ceases, conduction in tube 47 raises the cathode potential on tube 48 and tube 48 stops conducting. The voltage on the plate of tube 48 is thus increased causing tube 49 to conduct. This lowers the potential of the plate of tube 49 and the grid of tube 48. Consequently, tube 71 stops conducting and relay 72 opens, cutting off the 24 volts supply from relay 64 and opening it, the same as though the "local return" button 74 had been pushed.

The synchronizing pulses that are switched to the grid of tube 67 from either the remote or local source are amplified and appear on the plate as positive sync. Assuming that the sync from the remote location is in control, the waveform at the plate of tube 67 is as shown at Fig. 3*d*. This is applied to terminal 75 and to delay network 76.

The signal at terminal 75 will be discussed later. As shown in Fig. 1, the signal from the delay network 76 is selected by a switch 77 from any point along the network and applied to the grid of tube 78 through diode crystal 79. If the so-called "front port" portion of the remote television signal is correct as shown at *m* in waveforms *a*, *c*, and *d* of Fig. 3, switch 77 is set approximately half-way along the network 76, giving the signal shown at *e* of Fig. 3. This leading edge is in time with the beginning of the blanking pulse of the video portion shown at *b* of Fig. 3. If the front porch is too short as shown at *n* of waveform, Fig. 3*c*, the switch 77 is set nearer the terminated end of 76, increasing the delay so as to again bring the leading edge of the sync signal in time with the leading edge of the blanking. If the front porch is too long as shown at *p* of waveform, Fig. 3*c*, switch 77 is set nearer the input end of 76 giving less delay so that again the leading edges of blanking *b* and sync at *e* of Fig. 3 will coincide.

In this manner, improper duration of the front porch which may often exist in the remote television signal because of transmission idiosyncrasies can be corrected.

By means of the D. C. bias setting effect of the crystal 79 on the grid of tube 78 being actuated by the signal from switch 77, and also by constant cathode bias on tube 78, the sync signal as shown at *e* of Fig. 3 is clipped, removing any transients caused by delay 76 and finally limited to a constant amplitude and applied to terminal 80, Fig. 1. The signal at this point appears as at *f* of Fig. 3.

The above synchronizing signal is conveyed to terminal 100 in Fig. 2 and from there to the grids of tubes 101 and 102. This appears amplified at the plate of 102 in reversed phase, as at Fig. 3*e*, before entering delay line 103. This line is selected to give the desired front-porch delay of horizontal sync pulse behind horizontal blanking. This is 1.59 microseconds for the current RMA–FCC standard in the United States.

The above signal is amplified and clipped in tubes 104 and 105 and appears at the grid of tube 106 as waveform *g* of Fig. 3. This same phase appears as a cathode output at terminal 107 and in opposite phase, as at *h* in Fig. 3 at the 75 ohm output terminal 108. An amplitude of four volts at this point is a convenient value in the preferred embodiment.

Figure 5:
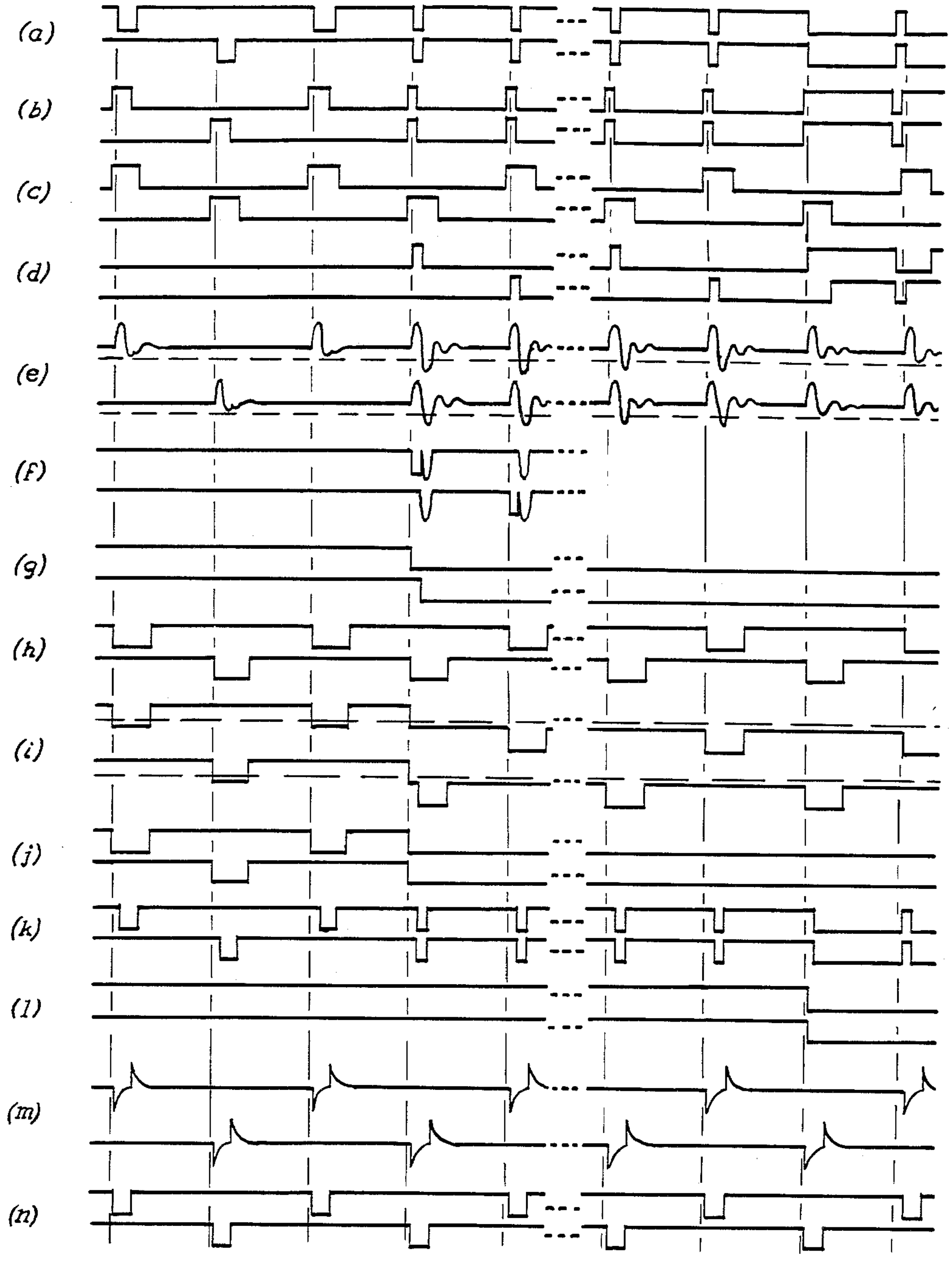
Fig. 5 shows the detail of waveforms involved in local pulse generation.

Fig. 5 is included to explain the significance of timing of both the horizontal and the vertical pulses. In this figure each reference letter pertains to a pair of waveforms, the first being the even field scan and the second the odd field scan. The signal at terminal 100 is shown as Fig. 5*a*. It is applied to the grids of both triodes 101 and 109 in Fig. 2.

The undelayed remote sync signal from terminal 75 of Fig. 1 is conveyed to terminal 111 of Fig. 2. It will be noted by reference to the waveforms of Fig. 3*d* and Fig. 5*b* that this signal occurs somewhat earlier than that at terminal 100. The signal at terminal 111 is amplified in tube 112 and the leading edges of the pulses in the plate circuit synchronize the horizontal multivibrator composed of tubes 113 and 114. This multivibrator supplies the series of horizontal pulses of Fig. 5*c*. Applied to the cathode of tube 101 the tube is cut off during these pulses so that the signal of Fig. 5*a* applied to the grid emerges at the plate as per Fig. 5*d*.

The signal of Fig. 5*a* when also applied to the grid of tube 109 appears at the plate as shown at Fig. 5*e* because of the parallel resonant circuit 115, 116 comprising the plate load. Having a resonant frequency of approximately 200 kilocycles, it will be noted that when the downward resonant response corresponds in time with the terminating stroke of the pulse the downward excursion of the transient is large. This occurs with the narrow equalizing pulses but not with the horizontal synchronizing pulses. Compare waveforms Fig. 5*a* and Fig. 5*e*. When this condition is fulfilled the transient amplitude extends below the dotted line in Fig. 5*e*.

This signal is inverted and amplified in tube 110 and applied to the grid of triode 117. A positive bias on the cathode of this tube is provided by a voltage divider from the positive plate voltage supply such that only that portion of the waveform of Fig. 5*e* below the dotted line appears at the plate of tube 117.

The waveform of Fig. 5*d* is impressed upon the grid of tube 118 and appears upon the plate in opposite phase. Since the plates of tubes 117 and 118 are connected together the combined signals appear as the waveform of Fig. 5*f*. This waveform is utilized to synchronize a multivibrator at field repetition frequency composed of tubes 119 and 120, having the duration of the vertical blanking pulse, adjustable by potentiometer 121. This pulse is timed according to Fig. 5*f*, thus not occurring at exactly the same time on odd and even scans. It is impressed upon the grid of tube 122.

In order to make this timing uniform a horizontal blanking pulse is fed-in according to the following process. Waveform Fig. 5*a* from terminal 100 of Fig. 2 is amplified through tubes 123 and 124, and differentiated by small capacitor 125. Triodes 126 and 127 comprise a horizontal blanking pulse multivibrator, providing a waveform according to Fig. 5*h*. The duration of this pulse can be adjusted by potentiometer 128.

It is to be noted in passing that the leading edges of pulses always remain as shown in the waveforms; duration adjustments affect only the timing of the terminating edges.

Continuing with the signal combining process, the vertical blanking pulse is amplified by tube 122 and the horizontal blanking pulse from tubes 126, 127 is amplified by tube 129. Since the plates of tubes 122 and 129 are connected together the signal there appears as Fig. 5*i*. This combined signal is amplified by tube 130 and applied to the grids of tubes 131 and 132. In both of these tubes the portion below the dotted line in Fig. 5*i* is clipped off because of zero grid limiting. The waveform is inverted with respect to Fig. 5*i* at these grids. The completed blanking signal of negative polarity as shown at Fig. 5*j* appears at terminal 133 at the plate of tube 131. A convenient amplitude of 4 volts across 75 ohms' impedance can be obtained with the apparatus described. At the cathode of tube 132 approximately 10 volts of positive polarity blanking appears across an impedance of 150 ohms, terminal 134.

In this way, I am able to synthesize standard blanking pulses from remotely originated synchronizing pulses. The timing of the leading edges of the complete blanking signal of Fig. 5*j* is the same as that of Fig. 3*b*, which is the original remote blanking. The final sync signal shown in Fig. 3*h* is repeated at Fig. 5*k* for indicating comparative timing.

As will be noted in Fig. 2, the waveform of Fig. 5*a* from terminal 100 is applied to the grid of tube 135, in which it is amplified and passed through an integrating network composed of capacitor 136 and resistor 137. The integrating process emphasizes the vertical synchronizing pulse and the resulting waveform appears as Fig. 6*c*. Tube 138 is biased by a positive voltage divider 139 to just below cut-off so that when the large sudden positive excursion of the waveform of Fig. 6*c* occurs the tube will conduct. On the plate of tube 138 the resulting pulse synchronizes a vertical driving pulse multivibrator, composed of tubes 140 and 141. The duration of the driving pulse can be adjusted by potentiometer 142.

The pulse from the multivibrator is applied to the grid of output tube 143, where zero grid limiting insures a rectangular waveform. At terminal 144 approximately 4 volts of vertical driving pulse as shown in Fig. 6*d* appears across an impedance of 75 ohms. This pulse occurs each sixtieth of a second with the current television standard. The start thereof is shown in Fig. 5*l* to indicate relative timing.

For the purpose of forming horizontal driving impulses, the sync signal of Fig. 5*a* from terminal 100 appears amplified at the plate of tube 123. Delay line 145 is connected thereto to delay the signal enough to cause it to occur just after the start of the horizontal blanking waveform of Fig. 5*j*. This signal is amplified by tube 146 and differentiated by small capacitor 147 to appear as the waveform of Fig. 5*m*. This is applied to horizontal multivibrator, tubes 148 and 149, for the synchronization thereof. The initiation of the pulses is determined by the synchronizing waveform and the duration is adjustable by means of potentiometer 150. These pulses are clipped and amplified by tubes 151 and 152.

The pulses are further clipped and amplified in tube 153 and approximately 4 volts of horizontal driving pulse appears at terminal 154 across 75 ohms. The waveform is as shown in Fig. 5*n*.

The composite delayed remote television signal shown in Fig. 3*b* and as applied to the grid of tube 14 of Fig. 1 is commonly referred to as a television signal of positive polarity. The positive horizontal blanking pulses from terminal 134 in Fig. 2, reproduced for timing comparison in Fig. 3*i*, are applied through terminal 94 of Fig. 1 to the cathode of tube 14. The two signals are additive upon the grid characteristic of the tube as shown at Fig. 3*j*. The blanking pulse amplitude of the signal has been increased by a convenient amount as shown by the amplitude between the two dotted lines in the waveform of Fig. 3*j*. The result is the positioning of the noisy and possibly transient-ridden black level and the synchronizing pulses of the signal further away from the image portion of the signal.

By varying the bias on tube 14 any amount of the waveform of Fig. 3*j* below the dashed line can be set below cut-off. This performs the important function of varying the blanking level of the remote signal away from the point of origin and is accomplished in the following manner.

Waveform Fig. 3*g*, similar to that of Fig. 4*a*, is available at terminal 107 in Fig. 2 and is applied to terminal 81 and to capacitor 82 in Fig. 1. In the same manner as clamping was accomplished on the grid of tube 7, clamping is accomplished on the grid of tube 14. In the prior instance, the undelayed signal was clamped by tube 34 utilizing undelayed sync pulses applied to capacitor 26, the bias being varied by potentiometer 36. In the present instance, the delayed sync pulses applied to capacitor 82 operate through the components and tubes 82 through 92, inclusive, to set the bias at point 93 and the grid of tube 14 and clamp the black level of the delayed signal combination applied to tube 14.

Attention is now called to the duration of the horizontal blanking waveform, Fig. 3*i*. This can be increased by adjustment of potentiometer 128, to persist, for instance, for the longer time indicated by the dotted suffix to the waveform. This has the effect of extending the blanking into the image content. When the clipping operation occurs as shown in Fig. 3*j* this image content is set down below the dashed line and is cut-off at the image output terminal 21. In this manner, the horizontal blanking duration in the remotely originated waveform can be increased, and by adjusting potentiometer 121 the vertical blanking duration can also be increased. This has the practical advantage that should a transient originate at either side of the image in the process of transmission between the plural locations, it can be removed.

The above described functions obtain when the system is operating on remote control. If the system is switched to local control, either manually at will or automatically because of the failure of the remote, the plate voltage on tube 49, Fig. 1, drops, with the result that the static D. C. voltage applied to the grid bias control of tube 14, potentiometer 92, which exists across resistor 91*a* to point 91, greatly lowers the static grid voltage of tube 14. This tube is cut-off and image signals are prevented from reaching the output terminal 21. This serves the useful purpose of automatically removing defective remote images from production use, particularly because these would not be in stable phase with the locally generated synchronizing pulses. Restoration of normal remote signal and control instantly removes the cut-off bias from tube 14 and allows the remote image to appear at output terminal 21.

Blanking, horizontal driving and vertical driving pulses from terminals 133, 154 and 144 are used to operate local cameras and equipment in the same manner as pulses from the usual local pulse generating system. In the usual local production manner both locally and remotely originated pictures can be switched, cross-faded or superimposed and added to the necessary synchronizing pulses from terminal 108, Fig. 2. The level of these synchronizing pulses are automatically maintained to properly and continuously modulate the transmitter.

In this manner are the several objects of my invention attained. In certain instances I have given numerical values and have used current television broadcasting technical and production terminology. This was for the purpose of aiding the understanding of my invention by the person skilled in this art and is not to restrict the application of my invention to the art in general.

The scope of my invention is indicated in the following claims.

I claim:

1. In a television system, means for originating local and remote television images in fixed phase which comprises, remote synchronizing and image signal producing means, local image signal producing means, a single remote to local television channel therebetween, coordinating means at the location of said local image signal producing means comprising, means for separating the remote synchronizing signals from the remote image signals, means for retiming the synchronizing signals an amount less than the interval between successive signals after remote image formation, and means for driving the locally originated image signal means from said retimed synchronizing signals.

2. In the coordinated operation of television apparatus at plural locations, means for altering at one location the contrast of a picture signal previously originated at another location comprising, single unidirectional means constituting the only coactive communication channel between said locations for conveying all components of said signal from the one to the other location, means at said other location for removing synchronizing impulses from said signal, means for amplifying the image impulses in said signal, means for re-establishing blanking level in said signal and means for re-inserting synchronizing impulses in said signal having substantially the same timing in relation thereto as the impulses which synchronized the original picture signal.

3. In the coordinated operation of television apparatus at plural locations, means for altering at one location the brightness of an image signal previously originated at another location comprising, single unidirectional means constituting the only coactive communication channel between said locations for conveying all components of said signal from the one to the other location, means for forming a blanking impulse from said signal, means for combining said blanking impulse and said signal, means for clipping said combined signal at a new blanking level and means for reinserting synchronizing impulses in said signal having substantially the same timing in relation thereto as the impulses which synchronized the original picture signal.

4. In the coordinated operation of separate television synchronizing apparatus at plural locations connected to a single channel, signal level sensitive means at one location for automatically transferring an electrical signal channel between plural separate sources of television electrical synchronizing energy comprising, amplitude responsive electronic means connected to said sources, a flip-flop circuit coactively connected to said amplitude responsive means, and an electronic switch connected to said sources and actuatingly connected to said flip-flop circuit; a low amplitude signal from a plural location other than said one affecting said amplitude responsive means to operate said flip-flop circuit and said electron switch to transfer said signal channel.

5. In the coordinated operation of separate television synchronizing apparatus at plural locations connected by a signal channel, means at one location for switching from one source of television electrical synchronizing energy to another of similar waveform having a low frequency component comprising; an integrating circuit connected to each of said sources to form a response of greater amplitude to the low frequency component of said waveform than to the rest thereof, amplitude responsive means connected thereto adjusted to pass an output when phase coincidence exists between said low frequency components of said waveforms, a bistable circuit operatively connected to said amplitude responsive means and to an electronic switch, said switch also operatively connected to both of said sources for the automatic switching thereof away from the source of amplitude below a predetermined level when actuated by said bistable circuit.

6. In the coordinated operation of television apparatus at two locations, means for operating separate synchronizing waveform sources having repetitive timed related components of both positive and negative polarity at said locations in fixed phase comprising electronic means for substantially continuously forming harmonically related components occurring first in time at one location from components which occurred relatively later in time at the other location, a circuit at said one location for subsequently delaying said components occurring first in time, and electronic means also at said one location for combining the components continuously formed with those subsequently delayed into a new waveform having repetitive timed related components of both positive and negative polarity.

7. In the coordinated operation of television apparatus at two locations, apparatus for producing cophased synchronizing and blanking waveform components having opposite polarities comprising, electronic means at one location for separating the synchronizing from the blanking components of the waveform originating at the other location, further electronic means at said one location for forming blanking components from said synchronizing components originating at said other location, a delay circuit for delaying said synchronizing components originating at said other location, and a circuit for combining said formed blanking components and said delayed synchronizing components in opposite polarities.

8. In the coordinated operation of television apparatus at plural locations, means at one location for removing interference from a television signal having blanking impulses originating at another location comprising a single unidirectional communication channel for conveying said signal from the originating location to said one location, a first means at said one location connected to said channel for forming blanking impulses in phase with the blanking impulses of said signal at said one location, a second means thereat connected to said first means for amplitude-combining the first mentioned blanking impulses with the formed blanking impulses, a third means thereat connected to said second circuit for clipping the amplitude-combined blanking impulses to the amplitude of one series of blanking impulses, a source of synchronizing impulses at said one location, and a fourth means connected thereto and to said third means for replacing a synchronizing impulse upon each clipped blanking impulse.

9. Means for locking the phase of timing pulses for superimposing a television image originating at one television equipment upon that which originated at a distant television equipment comprising, a single unidirectional television communication channel from said distant to said one equipment for conveying the image signal and timing pulses which originated at said distant equipment to said one equipment, a first means at said one equipment for forming delayed timing pulses from the conveyed timing pulses, a second means for delaying the image signal from said distant equipment, a television camera for forming a second image signal at said one television equipment, said camera being electrically connected to said first means for control of the image scanning means of said camera by said delayed timing pulses, and a third means for combining both the delayed and said second image signals and said delayed timing pulses to form the superimposed television image signal.

10. In the coordinated operation of television apparatus at two locations means at the second location for altering the duration of blanking impulses in a composite television signal which includes image and blanking impulses of one polarity and synchronizing impulses of opposite polarity, comprising; a single unidirectional signal channel from the first to said second locations, separate means at said second location for forming blanking impulses of normal amplitude in phase with those from said first location, second means including an adjustable time-constant circuit for extending the duration of said blanking impulses beyond those from said first location connected to said separate means, third means at said second location for combining said impulses with those from said first location, fourth means including an amplitude-limiting circuit for clipping the combined waveform in the polarity of said blanking impulses to normal blanking amplitude connected to said third means, and fifth means connected to said amplitude-limiting circuit for reinserting synchronizing impulses upon the clipped blanking impulses.

11. In the coordinated operation of television image-producing equipments at local and remote locations, means for automatically removing a weak image signal which originated at the remote location from a common circuit means at the local location which comprises a single unidirectional television image signal channel from remote to local locations, electronic means sensitive to image signal level connected to said channel at said location, means including a blocking circuit connected between said channel and said common circuit means, said electronic means connected to said blocking circuit means to block said circuit means for image signal transmission as long as said remote produced image signal is weak and to pass said remote produced image signal when the same is approximately as strong as locally produced image signals.

12. In a system for the cophased operation of television synchronizing devices producing at least vertical blanking, horizontal equalizing and horizontal synchronizing pulses at both remote and local locations, means for forming uniformly timed repetitive vertical blanking pulses comprising, a single unidirectional television communication channel from remote to local locations for conveying said pulses to said local location, means including an oscillatory circuit the response of which is greater to horizontal equalizing than to horizontal synchronizing pulses located at said local location, second means for connecting said channel to said oscillatory circuit means at said local location for impressing the remotely originated horizontal equalizing and horizontal synchronizing pulses upon said oscillatory circuit, a biased amplitude selective means at said local location connected to said oscillatory circuit means for separating the oscillatory pulse response of said oscillatory circuit to said equalizing pulses from the response of said oscillatory circuit to said synchronizing pulses, a vertical blanking pulse-producing means at said local location, a third means for connecting said amplitude selective means to said vertical blanking pulse-producing means for the synchronization of said vertical blanking pulse-producing means by the separated pulse of said amplitude selective means, a source of horizontal blanking pulses at said local location, a fourth means connected to said vertical blanking pulse-producing means and to said source for combining said horizontal blanking pulses with the vertical blanking pulses from said vertical blanking pulse-producing means, and means including a clipping circuit connected to said fourth means at said local location for clipping the combination of said horizontal blanking pulses with said vertical blanking pulses to the level giving rectangular vertical blanking pulses, the initial edges of said rectangular vertical blanking pulses being thereby advanced in time with respect to the initial edges produced by said vertical blanking pulse-producing means.

References Cited in the file of this patent

UNITED STATES PATENTS

| | | |
|---|---|---|
| 2,145,332 | Bedford | Jan. 31, 1939 |
| 2,164,297 | Bedford | June 27, 1939 |
| 2,194,278 | George | Mar. 19, 1940 |
| 2,195,103 | Urtel | Mar. 26, 1940 |
| 2,226,459 | Bingley | Dec. 24, 1940 |
| 2,227,045 | Urtel | Dec. 31, 1940 |
| 2,244,239 | Blumlein et al. | June 3, 1941 |
| 2,251,677 | Holmes | Aug. 5, 1941 |
| 2,258,943 | Bedford | Oct. 14, 1941 |
| 2,278,788 | Knick | Apr. 7, 1942 |
| 2,299,292 | Allen | Oct. 20, 1942 |
| 2,329,339 | De Baun | Sept. 14, 1943 |
| 2,343,634 | Baldwin | Mar. 7, 1944 |
| 2,490,561 | Ussler | Dec. 6, 1949 |
| 2,515,613 | Schoenfeld | July 18, 1950 |
| 2,534,337 | Canford et al. | Dec. 19, 1950 |
| 2,535,471 | White et al. | Dec. 29, 1950 |
| 2,570,775 | De Baun | Oct. 9, 1951 |
| 2,589,254 | Hoeppner | Mar. 18, 1952 |
| 2,611,819 | Serrell | Sept. 23, 1952 |